United States Patent
Ma et al.

(10) Patent No.: US 10,825,115 B2
(45) Date of Patent: *Nov. 3, 2020

(54) IDENTIFYING CORRELATED SERVICES DURING PROCESSING SERVICES

(71) Applicant: INTERNATIONAL BUSINESS MACHINES CORPORATION, Armonk, NY (US)

(72) Inventors: Chun E. Ma, Beijing (CN); Xin Sheng Mao, Beijing (CN); Matthew Wang, Charlotte, NC (US); Li Yi, Beijing (CN); Jun Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,349

(22) Filed: Jul. 16, 2018

(65) Prior Publication Data

US 2018/0322594 A1 Nov. 8, 2018

Related U.S. Application Data

(63) Continuation of application No. 13/551,284, filed on Jul. 17, 2012, now Pat. No. 10,026,135, which is a (Continued)

(30) Foreign Application Priority Data

Sep. 29, 2009 (CN) .......................... 2009 1 0179119

(51) Int. Cl.
*G06F 15/16* (2006.01)
*G06Q 50/10* (2012.01)
*G06Q 30/06* (2012.01)

(52) U.S. Cl.
CPC ............. *G06Q 50/10* (2013.01); *G06Q 30/06* (2013.01)

(58) Field of Classification Search
CPC ............................... G06Q 30/06; G06Q 50/10
See application file for complete search history.

(56) References Cited

U.S. PATENT DOCUMENTS

| 7,668,809 B1 | 2/2010 | Kelly et al. |
| 10,026,135 B2 | 7/2018 | Ma et al. |
| (Continued) | | |

FOREIGN PATENT DOCUMENTS

| CN | 102033884 A | 4/2011 |
| CN | 102789471 A | 11/2012 |
| (Continued) | | |

OTHER PUBLICATIONS

Wu, C., et al., "Aligning with the Web: an atom-based architecture for Web services discovery," Service Oriented computing and Applications SOCA (2007) vol. 1, pp. 97-116, May 24, 2007, 20 pgs.

(Continued)

*Primary Examiner* — Normin Abedin
(74) *Attorney, Agent, or Firm* — Cuenot, Forsythe & Kim, LLC

(57) ABSTRACT

A method for processing services can include receiving a request for a service; sending the result of the service in which at least one data item is tagged; in response to a selection of the tagged data item, determining other services associated with the service based on a service template of the service; and providing the other services associated with the service as options, wherein the other services take the at least one data item as inputs to provide outputs thereof.

18 Claims, 2 Drawing Sheets

Related U.S. Application Data continuation of application No. 13/498,955, filed as application No. PCT/EP2010/062769 on Aug. 31, 2010, now Pat. No. 10,043,225.

(56) References Cited

U.S. PATENT DOCUMENTS

| | | | |
|---|---|---|---|
| 2002/0069222 A1* | 6/2002 | McNeely | G06F 17/243 715/205 |
| 2006/0155656 A1* | 7/2006 | Kreder, III | G06Q 30/02 705/400 |
| 2008/0066099 A1 | 3/2008 | Brodersen et al. | |
| 2008/0319952 A1 | 12/2008 | Carpenter et al. | |
| 2009/0133059 A1 | 5/2009 | Gibbs et al. | |
| 2012/0185567 A1 | 7/2012 | Ma et al. | |
| 2012/0284365 A1 | 11/2012 | Ma et al. | |
| 2015/0128280 A1 | 5/2015 | Messer et al. | |

FOREIGN PATENT DOCUMENTS

| | | |
|---|---|---|
| CN | 103186531 A | 7/2013 |
| CN | 104137506 A | 11/2014 |
| WO | 2011039024 A2 | 4/2011 |

OTHER PUBLICATIONS

Gruber, T., "Collective knowledge systems: Where the Social Web meets the Semantic Web," Journal of Web Semanatics, Science, Services and Agents on the World Wide Web 6 (2008) 4-13, 10 pgs.

Paolucci, M., et al., "Semantic Matching of Web Services Capabilities," [online] in I. Horrocks and J. Hendler (eds.), Proc. of 1st Intl. Semantic Web Conference (ISWC). Sardinia:Springer, 2002, pp. 333-347, [retrieved Jun. 29, 2009] retrieved from the Internet: <http://www.cs.cmu.edu~softagents//papers/ISWC2002.ps.gz>, 20 pgs.

Kolbitsch, J., et al., "The transformation of the Web: How Emerging Communities Shape the Information we Consume," [online] Journal of Universal Computer Science, vol. 12, No. 2, Feb. 28, 2006, 27 pgs.

PCT Application PCT/EP2010/062769, Written Opinion, dated Mar. 12, 2012, 8 pgs.

PCT Application PCT/EP2010/062769, International Preliminary Report on Patentability, dated Apr. 3, 2012, 9 pgs.

Mang, X.M. et al., "The Research of Aggregation Technologies Effectively Supporting Web-based Learning Based on Mashup" Modern Educational Technology, Apr. 2009 [retrieved May 2, 2013], retrieved from the Internet: <http://en.cnki.com.cn/Article_en/CJFDTOTAL-XJJS200904029.htm>, 7 pgs.

Lingling, Q. et al., "Mashup Technology and Its Development [J]." Telecommunications Science, Sep. 2009 retrieved [May 2, 2013], retrieved from the Internet: <http://en.cnki.com.cn/Article_en/CJFDTOTAL-DXKX200909025.htm>, 1 pg.

U.S. Appl. No.. 13/498,955, Non-Final Office Action, dated Aug. 2, 2013, 25 Pg.

U.S. Appl. No. 13/498,955, Final Office Action, dated Dec. 2, 2013, 29 pg.

U.S. Appl. No. 13/498,955, Advisory Action, dated Mar. 3, 2014, 3 pg.

U.S. Appl. No. 13/498,955, Non-Final Office Action, dated Jul. 7, 2014, 14 pg.

U.S. Appl. No. 13/498,955, Final Office Action, dated Nov. 4, 2014, 16 pg.

U.S. Appl. No. 13/498,955, Non-Final Office Action, dated Sep. 24, 2015, 18 pg.

U.S. Appl. No. 13/498,955, Final Office Action, dated Mar. 24, 2016, 18 pg.

U.S. Appl. No. 13/498,955, Examiner's Answer, dated Jan. 27, 2017, 21 pg.

U.S. Appl. No. 13/498,955, Decision on Appeal, dated Dec. 22, 2017, 16 pg.

U.S. Appl. No. 13/498,955, Notice of Allowance, dated Apr. 6, 2018, 8 pg.

U.S. Appl. No. 13/498,955, Notice of Allowance, dated Apr. 18, 2018, 2 pg.

U.S. Appl. No. 13/551,284, Non-Final Office Action, dated Aug. 6, 2013, 17 pg.

U.S. Appl. No. 13/551,284, Final Office Action, dated Dec. 3, 2013, 18 pg.

U.S. Appl. No. 13/551,284, Advisory Action, dated Mar. 14, 2014, 5 pg.

U.S. Appl. No. 13/551,284, Non-Final Office Action, dated Jul. 8, 2014, 9 pg.

U.S. Appl. No. 13/551,284, Final Office Action, dated Nov. 4, 2014, 13 pg.

U.S. Appl. No. 13/551,284, Non-Final Office Action, dated Sep. 24, 2015, 12 pg.

U.S. Appl. No. 13/551,284, Final Office Action, dated Mar. 24, 2016, 14 pg.

U.S. Appl. No. 13/551,284, Examiner's Answer, dated Feb.13, 2017, 15 pg.

U.S. Appl. No. 13/551,284, Decision on Appeal, dated Dec. 22, 2017, 15 pg.

U.S. Appl. No. 13/551,284, Notice of Allowance, dated Mar. 19, 2018, 9 pg.

* cited by examiner

IDENTIFYING CORRELATED SERVICES DURING PROCESSING SERVICES

CROSS-REFERENCE TO RELATED APPLICATIONS

This application is a Continuation of U.S. application Ser. No. 13/498,955, filed on 29 Mar. 2012, which is the national stage of PCT/EP2010/062769, filed 31 Aug. 2010, designating, inter alia, the United States and claiming priority to Chinese Patent Application 200910179119.9 filed 29 Sep. 2009, each of which is hereby incorporated by reference.

BACKGROUND

One or more embodiments relate to computer network technology and, more particular, to a method and a system for processing services. With the rapid development of electrical techniques over the last twenty years, there has been an explosive growth in the performance and capacity of computer networks, particularly, the Internet. Many users interact with web servers for some personal or business purposes. In this regard, users may browse and exploit various web services, such as conference organization, flight booking, hotel reserving, customs shown, and the like. As to conference organization, for example, a user may wish to reserve a meeting room, check notifications about present schedule and receive messages from participants over a network. For online flight booking, a user may need to check the departure time of the flight, the airline company information, confirm the flight, or pay for the flight. During the execution of the above actions, it is necessary for users to correlate and exploit several correlated services.

However, there is a lack of associations between various services on networks. In other words, there are no links between the services. Users usually have to access several services depending upon their own experiences and knowledge, copying and pasting some data between multiple services to achieve a particular purpose.

BRIEF SUMMARY

In view of the above disadvantages, according to one embodiment of this invention, a method for processing services is provided, comprising: receiving a request for a service; sending the result of the service in which at least one data item is tagged; determining, using a processor, other services associated with the service based on a service template of the service in response to a selection of the tagged data item; and providing the other services associated with the service as options; wherein the other services take the at least one data item as inputs to provide their outputs.

According to another embodiment of this invention, a system for processing services is also provided. The system can include a processor configured to execute program code, wherein responsive to executing the program code, wherein responsive to executing the program code, the processor implements one or more modules, comprising: a request reception module for receiving a request for a service; a result transmission module for transmitting the result of the service in which at least one data item is tagged; an other service determination module for determining other services associated with the service based on a service template of the service in response to a selection of the tagged data item; and a service option provision module for providing the other services associated with the service as options; wherein the other services take the at least one data item as inputs to provide their outputs.

BRIEF DESCRIPTION OF THE SEVERAL VIEWS OF THE DRAWINGS

The aforementioned and other objects, features and advantages of the present invention will become more apparent from the detailed description of embodiments of this invention, which are shown in the accompanying drawings, wherein.

DETAILED DESCRIPTION

Hereinafter, the present invention will be described with reference to the methods and apparatus of the embodiments, wherein each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
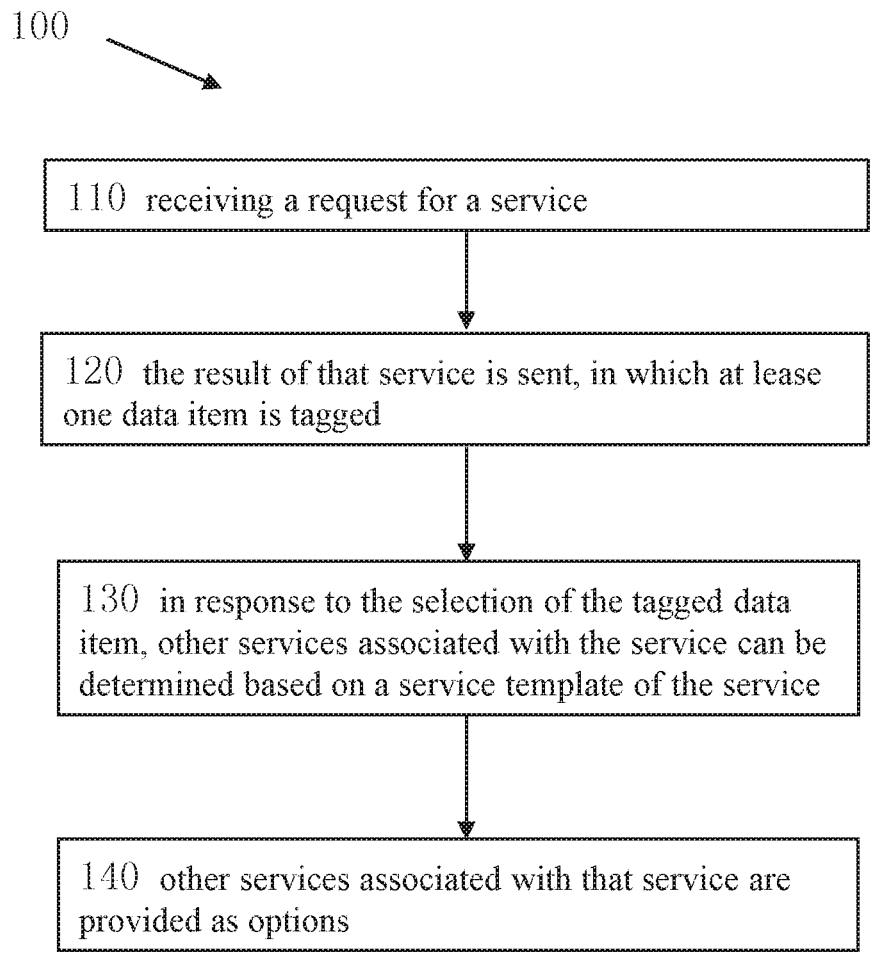
FIG. 1 is a flowchart for processing services according to one embodiment of this invention.

FIG. 1 is the flowchart for processing services according to one embodiment of this invention, showing a method 100 for processing services, such as, web services. With this method, two or more services may be associated together to provide a comprehensive service as a whole. For example, as to a particular article, a searching service, a performance comparing service, a price comparing service, a payment service, a delivery service and the like may be associated together to satisfy purchase requirements of users. The method also can be used to dynamically provide some service options. Furthermore, the method 100 can include but is not limited to be executed on a functional server.

As shown in FIG. 1, the method 100 may comprises the following steps. At step 110, receiving a request for a service. For example, a request for retrieving a book is received. At step 120, the result of that service is sent, in which at least one data item is tagged. For example, at least one data item contained in the result may be tagged through, for example, coloring, underlining or highlighting the descriptive contents. As to the result of the retrieving service, some book names or book numbers may be tagged as data items for the use of other services. As to web applications on user side or Mashup applications, a number of APIs (Application Programming Interface) may be provided for developers or clients with respect to the above service to enable interaction. These APIs may comprise but not limited to REST APIs, JavaScript APIs, Microformat or Widgets, which can provide users with the capabilities of searching for, navigating through, or acquiring relative web services in a certain environment through user clients. Thus, lower technical requirements are expected for users, significantly simplifying user experiences and enabling more users to utilize the service. A user may receive the result of the service through his client in which at least one data item is tagged, and the user may select the at least one data item if he wants to learn about the service related to the data item.

In the method shown in FIG. 1, at step 130 in response to the selection of the tagged data item, other services associated with the service can be determined based on a service template of the service.

Herein, a service template may refer to the summarized common features of a kind of service (e.g., service for providing book prices based on ISBNs), which may comprise some parameters for which different values may lead to different services. Languages such as XML, HTML and the like can be adopted to describe the service features and parameters in the template.

For instance, a URI with a parameter is a service template. When the parameter is determined, a particular service can be determined by the template accordingly. For example, a template of book service can be in the form of http://www.example.com/books/{ISBN}, wherein {ISBN} is a parameter representing a specific book number. Upon the determination of the book number, a service directed to a specific book can be determined according to the template. If the book number is 23456, for example, a service aimed to a particular book at http://www.example.com/books/23456 can be obtained through the template. As to the web widget service template for stock query services below, according to the different value of the parameter StockCode, different stock query services may be obtained.

a corresponding service, which is also referred to as URI service template in this description for the simplicity of its reference.

Wherein determining other service options associated with the service may further comprises: determining the other service options above mentioned based on the context of the service and tags provided to other services. Further, it is also possible to determine the other service options based on the context of the service and metadata of other services. Further, the other service options can be determined based on the context of the service and the descriptive notes of other services.

Wherein, determining the service template of the service may further comprise: determining the context of the service, and determining the service template based on the context of that service. The context of the service may comprise its URI. The context of the service can be sent from user side, or can be initiatively collected by a server during its service. The context may comprise one or more data inputted by users in the service environment, data provided by the service, or the combinations thereof. The template of the service can be determined through search or query based on its context, so as to determine the other service options associated with the service.

In the method shown in FIG. 1, at step 140, other services associated with that service are provided as options. Thus, a user can switch to the other services by selecting other services, or associate the service with the other services. The other service options may comprise one or more other services that can be determined based on a lot of feedbacks from users. Those skilled in the art may understand that the other service templates may be used as the options directly, and may take the at least one data item said above as its input after the user select the options, or the data item can be inputted into the other service templates directly to obtain the other service options.

Wherein providing the other services associated with that service as options may further comprise: ranking the other services; and providing the other services associated with that service as options according to their ranks. Wherein ranking the other service options may further comprise: according to the association scores between the other service templates and that service template, determining the association scores (or the weights) between the other services

```
<iw:iwidget name="gadget" xmlns:iw="http://www.ibm.com/xmlns/prod/iWidget"
       iScope="com.ibm.mm.google.gadget.gadgetClass"
    allowInstanceContent="true"
       supportedModes="view edit" mode="view" lang="en">
       <iw:itemSet id="attributes" >
          <iw:item id="StockCode" value="{StockCode}" readOnly="false"/>
       </iw:itemSet>
       <iw:content mode="view">
    <![CDATA[
          <div class="gadgetContent"></div>
    ]]>
    </iw:content>
</iw:iwidget>
```

By means of the data item, the service can be associated with other services that take the at least one data item as their inputs to provide their outputs. Wherein determining other services associated with the service based on the service template of the service may further comprises: determining the service template of the service; determining other service templates associated with the service template; and determining the other services based on the other service templates. Wherein, a service template may comprise the URI of and that service; ranking the other services based on the association scores, wherein services with higher association scores are ranked before services with lower scores.

According to another embodiment of this invention, the above method may further comprise: receiving a selection of another service from among the other services; and increasing the association score between the service template of the another selected service and the template of that service. The above method may further comprise: receiving the association scores between at least one of the other services and the service for updating the rank of the other services. Thus, the administrator of the related services can provide the associations between the services based on his professional experiences. Wherein, the services can be identified by the service templates. For example, an URI template can be used to identify a service, or the template can be defined by metadata or descriptive data of the service to identify the service. The associations between specific services can be reflected as the associations between the service templates. Therefore, the instances of the associated service templates can be correlated with each other by the service temple.

According to another embodiment of this invention, determining the other service options associated with the above service may further comprise: determining the service template of the above service; determining the other service templates associated with that service template; and determining the other services based on the other service templates. The other service templates may be used as the options directly, and the at least one data item said above can be taken as their inputs after the user select the options, or the data item can be inputted into the other service templates directly to obtain the other service options.

According to one embodiment of this invention, the resource of a service can be identified by URI (Universal Resource Identifier). An URI template can define a kind of service. In other words, the URI of a service can be matched with a URI template to identify a kind of service. For example, a book related service can be identified by the URI template http://www.example.com/books/{ISBN}.

The URI template may use several parameters or doesn't have any parameter. For example, ISBN that represents the value of a book number can be used as a service parameter, such as 12345, and the hyperlink "http://www.example.com/books/12345" is a book service, which can be found through a string matching procedure.

The parameter of the URI template can be used as the data item of the book service and can be highlighted in the service result. The parameter can also be associated with another parameter inputted into other service, for example, the input data items of another book related service may comprise the ISBN. The book related service can be connected to other book related services through the ISBN within its URI. For example, another book related service may provide book price by ISBN, that is, taking an ISBN as an input and outputting the price of the book. Hence, the data item in the service result can be identified in the URI and its linked paths. Associating two services with URI can establish the correlation between those services conveniently, which can simplify relationship representations between services and speed up the search and query of associated services.

Thus, a URI template can be used to define a kind of service, for example, services providing access to various books. The correlations between services can be determined in real time through the URI without the tedious efforts of predetermining the relationships between lots of services.

In response to a user selection of the data item within the service result, a JavaScript in the service page can invoke a REST API, which can search other associated services using the URI of the service, the parameter of the service, or the linked paths of the URI.

According to REST in which the whole network is observed from the perspective of resource, resources distributed throughout the network can be determined by URIs. Applications on clients can acquire the representations of resources through the URIs, and the acquisition of these representations can cause the applications to transfer their states. With the continuous acquisition of resource representations, client applications can continually transfer their states, i.e., so called as representational state transfer.

REST are usually based on widely prevalent protocols and standards, using such as HTTP, URI, XML, and HTML. Resources are assigned by URI. Operations implemented on resources may comprise acquiring, creating, modifying and deleting resource, which exactly correspond to the GET, POST, PUT and DELETE methods of the HTTP protocol. Resource operations can be implemented through resource representation operations. Depending on whether the reader is a human being, a machine, a client application utilizing the web service, or a web browser, the resources can be represented in the form of XML or HTML.

According to another embodiment of this invention, one web service may provide some data, such as some ISBNs. Other web service may do something relatively and require some input, such as some ISBNs, by which it can provide prices of those books. Thus, two web services can be associated with each other, wherein the data provided by one web service can be utilized by another service. Through establishing such associations, diversity methods can be invoked when utilizing such a service.

Mashup procedure is a procedure that may associate two or more web services. Two or more web services can be associated through data input and output, that is, one web service may provide data that can be used by another service to complete its predetermined function.

Through establishing associations between services, various services can function smartly together. The associations between web services can be established in many manners.

For example, the administrators of some dedicated systems may provide professional web service associations in the manner of system configuration. This manner may be the default manner for associating web services, which is the common method for associating multiple web services in a particular field so as to complete particular functions of that field. The relationships between services can be defined by an administrator and can be added to the dedicated system through APIs or a specification of data relationship definitions. For example, it can be queried what data is needed by a web service A through an API, then other services that provide such data can be retrieved with some tools. In general, business partners are more familiar with their own business fields. The above manner can be used to initialize some web service systems.

As another example, during the implementation of a matter by user themselves, the matter is observed to recognize the same and/or similar interaction relationships between several web services (such as, data input and output relationship). Unlike the limited knowledge owned by administrators of particular systems and business partners, users may have diversity knowledge, and the web services may be used in a variety of manners, wherein those relatively reasonable or optimal ones may likely have many identical or similar aspects. The data interaction procedures between web services are just comparable to the information communication procedures in real society, for which the typical ones are always repeated by most people.

Typical interaction relationships can be recognized through extracting typical interactions from those implemented between the web services used by many people. Then the associations between the web services can be found based on some predetermined service relationship models.

Users can tag web services in various manners, such as, tagging different functions with web 2.0, in such a manner, the potential relationships between those services can be realized through analyzing the correlation and the similarity therebetween.

Users may provide various tags to every service, and the possible associations between services can be found by means of those tags (in other words, other services possibly associated one service can be found by means of the tags assigned to that service). Those associated services can be recommended to users. As to book purchase, other services having tags associated with book purchase can be found.

There may be an extent of similarity between the description A of one service and the description B of another service, and can be advised to users as a potential association. Wherein, one service may comprise note A, and another service may comprise note B.

Furthermore, each web service may comprise metadata to characterize itself, for example, XML formatted metadata may be used to define the input and output of a web service (such as, data types of input and output data), and the relationships between services also can be determined according to such formal descriptions.

The associations between web services can be determined in the above manners (e.g., according to metadata, descriptive note of a web service, and tags). For example, statistical models can be used to determine association scores between services. Hence, the associations between web services can be determined, as well as those services with higher associations.

A user selection of a web service is a procedure that turns a possible correlation into an assured association, and as a feedback, can be used to optimize the advised service options. The selections of users are assured decisions of users, and the computer calculations mentioned above are uncertain, inaccurate, and indistinct, which only can be converted into indeed possible data through user selections.

The longer the system according to the embodiment of this invention runs and the more people the system reaches, the more feedbacks the system can accumulate and the more accurate web services it can advise to users, and therefore the system can become more "clever".

Figure 2:
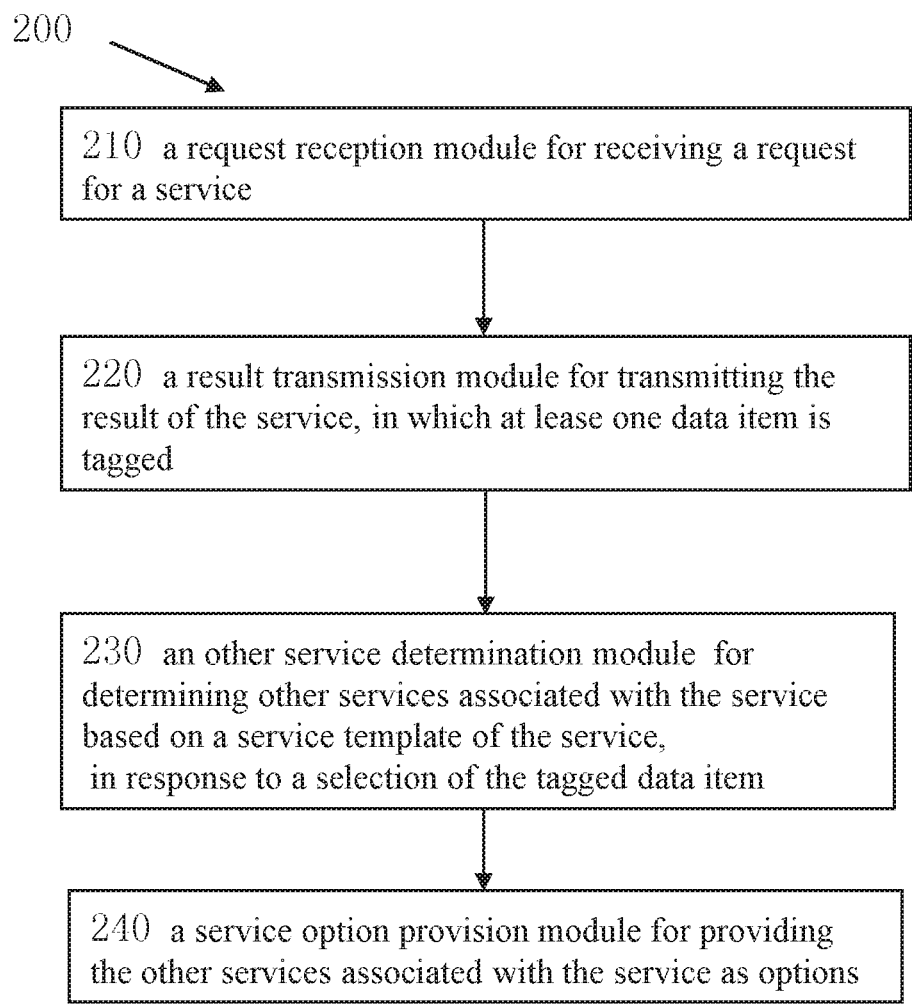
FIG. 2 is a block diagram of the system for processing services according to another embodiment of this invention.

FIG. 2 shows a block diagram for processing services according to another embodiment of this invention. The system may comprise a request reception module 210 for receiving a request for a service; a result transmission module 220 for transmitting the result of the service in which at least one data item is tagged; an other service determination module 230 for determining other services associated with the service based on a service template of the service in response to a selection of the tagged data item; and a service option provision module 240 for providing the other services associated with the service as options, wherein the other services take the at least one data item as inputs and provide outputs thereof.

Wherein the other service determination module 230 may further comprise a service template determination module for determining the service templates of the other services; and an other template determination module for determining the other service templates associated with the service template, wherein the other service determination module 230 determines the other services based on the other service templates.

Wherein, the service option provision module may be further configured to determine the context of the service; and determine the service template of the service based on the context of the service.

Wherein, the service option provision module 240 may further comprise a rank module for ranking the other services, and the service option provision module 240 is further configured to provide the other services associated with that service as options according to their ranks.

Wherein the rank module may further comprise an association score determination module for determining the association scores between the other services and that service according to the association scores between the other service templates and that service template; and the rank module can be further configured to rank the other services based on the association scores, wherein services with higher association scores are ranked before services with lower scores.

Wherein, the above system may further comprises a feedback reception module for receiving a selection of another service from among the other services, and increasing the association score between the service template of the another selected service and the template of that service. Wherein, the service templates may comprise the URIs of corresponding services.

Wherein, the above system may further comprise a service association module for receiving a selection of one of the other services; and associating the service with the selected service.

The present invention also provides a storage medium or signal carrier comprising instructions for carrying out the method of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described in detail in connection with preferable embodiments. It will be appreciated however those embodiments are merely illustrations and not limitations of this invention. Many modifications and variations will be apparent to those of ordinary skill in the art without departing from the scope and spirit of the invention.

The invention claimed is:

1. A computer hardware system configured to process computer-implemented services, comprising:
a hardware processor configured to initiate the following executable operations:
receiving, from a client computer, a request for a computer-implemented service;
sending, in response to the request and to the client computer, a result of the computer-implemented service being performed and the result includes a tagged data item;
receiving, from the client computer, an indication that the tagged data item has been selected;
identifying, responsive to the indication being received and using a service template of the computer-implemented service, other computer-implemented services correlated to the service;
providing, to the client computer to be displayed as options, the other computer-implemented services, wherein
the service template of the service includes a context of the service,
the other computer-implemented services are identified using the context,
the tagged data item, upon being displayed on the client computer, indicates that the other computer-implemented services are selectable within the display.

2. The system of claim 1, wherein
the other computer-implemented services are identified using other service templates respectively associated with each of the other computer-implemented services.

3. The system of claim 2, wherein
the other computer-implemented services are displayed on the client computer in a ranked order.

4. The system of claim 3, wherein
the other computer-implemented services are ranked according to association scores between the other service templates and the service template of the service.

5. The system of claim 4, wherein
an association score between one of the other service templates and the service template of the service is increased upon a user selecting a computer-implemented service associated with the one of the other service templates.

6. The system of claim 1, wherein
the context is data provided by the computer-implemented service.

7. The system of claim 1, wherein
the context is data provided by the client device.

8. The system of claim 1, wherein
the tagged data item is an input for each of the other computer-implemented services.

9. The system of claim 1, wherein
the other computer-implemented services are identified by match a tag associated with the service template with tags respectively associated with each of the other computer-implemented services.

10. A computer program producing, comprising:
a hardware storage device having stored thereon computer usable program code,
the computer usable program code, which when executed by a computer hardware system, causes the computer hardware system to perform:
receiving, from a client computer, a request for a computer-implemented service;
sending, in response to the request and to the client computer, a result of the computer-implemented service being performed and the result includes a tagged data item;
receiving, from the client computer, an indication that the tagged data item has been selected;
identifying, responsive to the indication being received and using a service template of the computer-implemented service, other computer-implemented services correlated to the service;
providing, to the client computer to be displayed as options, the other computer-implemented services, wherein
the service template of the service includes a context of the service,
the other computer-implemented services are identified using the context, the tagged data item, upon being displayed on the client computer, indicates that the other computer-implemented services are selectable within the display.

11. The computer program product of claim 10, wherein the other computer-implemented services are identified using other service templates respectively associated with each of the other computer-implemented services.

12. The computer program product of claim 11, wherein the other computer-implemented services are displayed on the client computer in a ranked order.

13. The computer program product of claim 12, wherein the other computer-implemented services are ranked according to association scores between the other service templates and the service template of the service.

14. The computer program product of claim 13, wherein an association score between one of the other service templates and the service template of the service is increased upon a user selecting a computer-implemented service associated with the one of the other service templates.

15. The computer program product of claim 10, wherein the context is data provided by the computer-implemented service.

16. The computer program product of claim 10, wherein the context is data provided by the client device.

17. The computer program product of claim 10, wherein the tagged data item is an input for each of the other computer-implemented services.

18. The computer program product of claim 10, wherein the other computer-implemented services are identified by match a tag associated with the service template with tags respectively associated with each of the other computer-implemented services.

* * * * *